May 14, 1940.  C. SAUZEDDE  2,200,305
PISTON SEAL
Filed Oct. 30, 1936  2 Sheets-Sheet 1

INVENTOR
Claude Sauzedde,
BY
ATTORNEYS

Patented May 14, 1940

2,200,305

UNITED STATES PATENT OFFICE 2,200,305

PISTON SEAL

Claude Sauzedde, Detroit, Mich., assignor to Detroit Hydrostatic Brake Corporation, Detroit, Mich., a corporation of Michigan Application October 30, 1936, Serial No. 108,351

5 Claims. (Cl. 60—54.6)

This invention relates to means for sealing chambers in which reciprocating elements are mounted to be moved in response to fluid pressure in the chambers, or wherein the elements are to be moved by pressure means external to the chambers to place pressure on fluid in the chambers in which they are mounted. It refers more particularly to hydrostatic brake systems wherein pistons movably received in chambers and connected to brake shoes are moved with respect to their chambers by fluid under pressure.

The primary object of the present invention is to provide a sealing means, between a piston head and the wall of a cylindrical chamber in which it operates in response to fluid pressure, which is positively non-leakable and which is designed to embody high wear resisting properties. The sealing means is in the form of an open-ended cylinder and is formed of elastic material such as rubber, and the cylindrical rubber body or sleeve has an annular metallic reinforcing surface bonded to each end thereof. For example, if the sleeve is formed of rubber it may be vulcanized to the annular reinforcing members. In assembling the seal in a brake of the hydrostatic type one of the metal reinforcing members is clamped to the wall of the cylinder and the other reinforcing member is clamped to the wall of the piston which operates in the cylinder. This manner of clamping the annular reinforcements to the cylinder wall and piston head provides for a metal to metal contact and permits the clamping parts to be tightened into such firm engagement that leakage of fluid past the piston is positively prevented. This metal to metal contact is also advantageous in that it permits sealing elements of the deformable, soft metal type to be interposed between the clamped parts to enhance the sealing action and render it more positive.

Another object of the present invention is to provide sealing means for hydrostatic brakes which is in the form of two concentric elastic sleeves with the space between the two sleeves comprising a fluid pressure chamber. In this form the inner sleeve has an inner annular metallic reinforcement at one end and the outer sleeve has an outer annular metallic reinforcement at the corresponding end. These two reinforcements are clamped to the stationary body or spider which is designed to support the brake shoes while the other ends of the sleeves are surface bonded directly to the element which moves in response to the fluid pressure. The sleeves are made of a length providing sufficient material to permit the necessary stretching action without damage to the seals and the space resulting from elongation of the seals in this manner is filled with a separate annular filler. The actual amount of space which is filled with fluid when the brakes are inoperative is therefore comparatively small.

With the above and other ends in view the invention consists in matters hereinafter more particularly set forth with reference to the accompanying drawings, in which.

Like characters of reference are employed throughout to designate corresponding parts.

Figure 1:
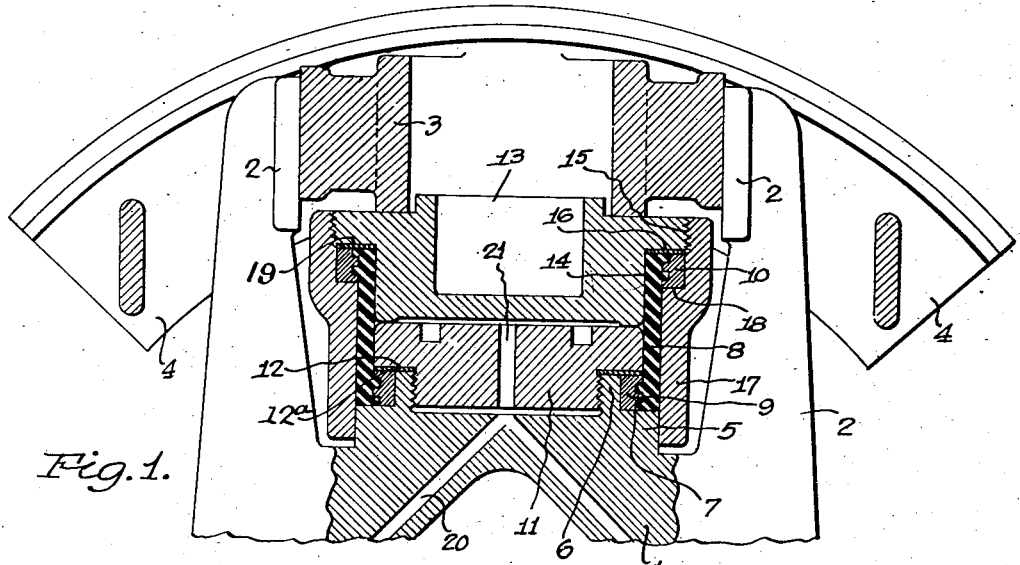
Figure 1 is a vertical section.
Figure 2:
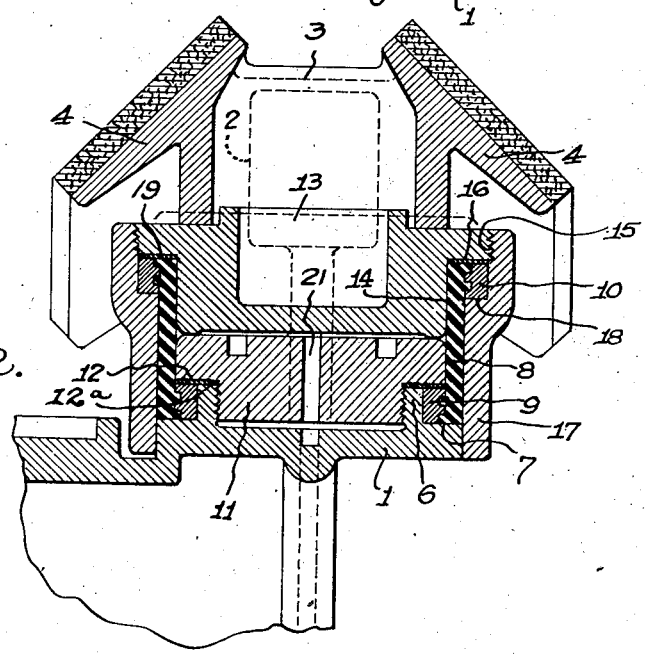
Fig. 2 is a vertical section taken on a plane transverse to Fig. 1.

The numeral 1 designates a fragment of a spider such as ordinarily provides the support for brakes within a vehicle wheel. Such spiders and brake assemblies with respect to vehicle wheels are already well known in the art and therefore are not shown in detail here. Integral with the spider are two guide arms 2 between which a bridge member 3, supporting brake shoes 4, is slidable radially. Between the arms 2 the spider is formed with a cylindrical projection 5 with its axis extending radially. At its outer end the cylindrical projection 5 has a co-axial, internally threaded, annular formation 6, the outer diameter of the annular formation 6 being less than the diameter of the projection 5 whereby to form a shoulder 7. The face of the shoulder 7 is formed in a plane normal to the axis of the annular formation 6 and is machined smooth.

A cylindrical body or sleeve 8, formed of elastic material such as rubber, has an annular metallic reinforcement 9 the surface of which being bonded to the lower end of 8, the reinforcement being internally disposed with respect to the end of the sleeve and having serrations on its external surface for increasing the tenacity of the surface bonding. The end of the sleeve may be vulcanized to the reinforcement 9, for example, or it may be secured thereto by suitable adhesives. At its other end the sleeve 8 has an annular metallic reinforcement 10 the surface of which being bonded thereto, externally thereof, the inner surface of the reinforcement 10 being provided with serrations to increase the efficiency of the surface bonding action.

Received in the annular formation 6 is a screw-threaded clamping element 11 having a shoulder 12 which bears against the annular reinforcement 9 to press it into firm engagement with the shoulder 7. A deformable sealing element 12a, that is, a sealing element of soft metal such as aluminum, is placed between the shoulder 12 and the reinforcement 9 and also extends between the shoulder 12 and the end surface of the annular formation 6. By tightening the clamping element 11 the contacting surfaces of the shoulder 7, annular member 9 and shoulder 12 may be brought into such firm engagement that passage of fluid therebetween is impossible.

Loosely received between the arms 2 is an element 13 having a cylindrical formation 14 disposed within the other end of the sleeve 8. The upper end of the element 13 supports the bridge member 3 and this end is further provided with an externally screw-threaded portion 15 and a shoulder 16. A hollow cylindrical body 17, formed with an internal shoulder 18, is screwthreaded onto the screwthreaded portion 15 and the annular reinforcement 10 is clamped between the shoulders 16 and 18 thereby. A deformable seal 19, formed of aluminum for example, is interposed between the annular reinforcement 10 and the shoulder 16. The hollow cylindrical body 17 encloses the elastic sleeve 8 and its lower end finds bearing on the cylindrical projection 5.

The spider 1 is provided with passages 20 which communicate with a port 21 extending through the clamping element 11 and serve to convey fluid under pressure to the space between the elements 11 and 13. When fluid under pressure is so introduced to this space the element 13 moves outwardly radially with respect to the spider and engages the bridge member 3 to force the brake shoes 4 outwardly. During such movement of the element 13 the elastic sleeve 8 is stretched but is prevented from expanding radially of itself by the confining surfaces of the cylindrical body 17. The two elements 11 and 13 are maintained in co-axial alignment during such movement by engagement of the lower end of the hollow cylindrical body 17 with the cylindrical projection 5.

Figure 3:
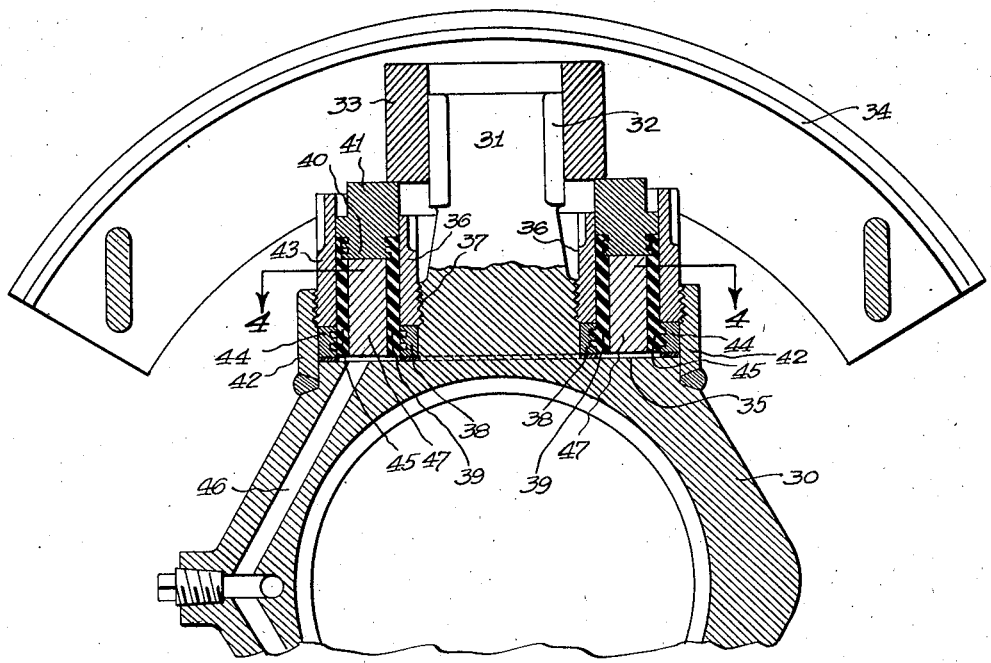
Fig. 3 is a vertical section of a modified brake construction.
Figure 4:
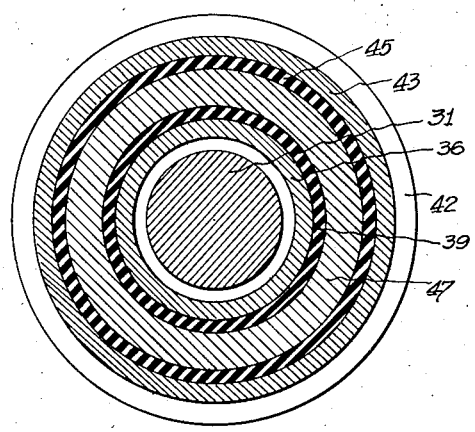
Fig. 4 is a view taken on the line 4—4 of Fig. 3.

Referring to Figs. 3 and 4 there is illustrated a stationary spider 30 having a radially projecting shank 31 with guide portions 32. Slidably received upon the guide surfaces 32 is a cross member 33 which supports a pair of brake shoes 34, one of which is shown in Fig. 3. At the base of the shank 31 is provided a shoulder 35, and a cylindrical retainer 36 which is secured upon the screwthreaded portion 37 of the shank clamps an annular metallic reinforcement 38 against the shoulder 35. An elastic seal 39 has one end thereof surface bonded to the annular reinforcement 38 and its other end surface bonded to an annular projection 40 on a movable element 41. Surrounding the base of the shank 31 is an annular formation 42 screwthreadedly receiving a retainer 43 which clamps an annular metallic reinforcement 44 against the shoulder 35. One end of an elastic sleeve 45 is surface bonded to the inner surface of the annular reinforcement 44 and its other end is surface bonded to the annular projection 40 on the movable element 41.

The two sleeves 39 and 45 are thus concentrically disposed and the space therebetween constitutes a fluid pressure chamber. The spider 30 is provided with passages 46 for conveying fluid under pressure to the space between the two concentric elastic sleeves. An annular filler 47 is mounted between the two sleeves 39 and 45 to occupy a major portion of the space therebetween to reduce the amount of fluid necessary to fill such space.

When fluid under pressure is supplied through the passages 46 to the pressure chamber formed as above described it acts upon the filler 47 and the annular projection 40 to move the movable element 41 outwardly with respect to the shank 31. During such movement the movable element engages the cross member 33 and forces the shoes 34 outwardly for contact with a brake drum. The usual springs, not shown, are used to retract the shoes and to move the cross member 33 and movable element 41 back to the position shown in Fig. 3.

Figure 5:
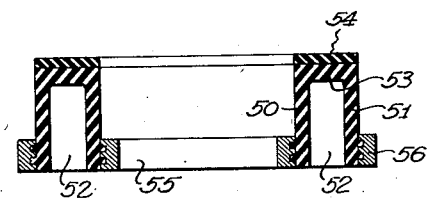
Fig. 5 is a section of another form of seal.

In Fig. 5, there is shown a modified seal adapted for assembly in a brake construction such as shown in Fig. 3. In this form the seal comprises inner and outer annular walls 50 and 51 respectively, the two walls being of different diameters whereby a space 52 is provided therebetween. The space between the two walls 50 and 51 is closed at one end by an integral annular wall 53, preferably having a comparatively hard surface portion as indicated at 54. Surface bonded internally to the open end of the wall 50 is an annular metallic reinforcement 55 and surface bonded externally to the outer wall 51 is an annular metallic reinforcement 56.

In assembling the seal shown in Fig. 5, in a brake such as shown in Fig. 3, the two reinforcements 55 and 56 are clamped against the shoulder 35 by retainers such as shown at 36 and 43 respectively.

Although a specific embodiment of the invention has been illustrated and described it will be understood that various changes may be made within the scope of the appended claims without departing from the spirit of the invention, and such changes are contemplated.

What I claim is:

1. In a hydrostatic brake, a stationary body, an element movably mounted on said body and guided thereby for movement with respect thereto, a pair of concentric elastic sleeves having a space therebetween providing a fluid pressure chamber, said elastic sleeves each having one end secured to said stationary body and one end secured to said movable element, and means for conveying fluid under pressure to said pressure chamber.

2. In a hydrostatic brake, a stationary body, an element movably mounted on said body and guided thereby for movement with respect thereto, a pair of concentric elastic sleeves having the space therebetween providing a pressure chamber, said movable element having an annular projection extending between said sleeves at one end thereof and having said ends of said sleeves surface bonded thereto, means securing the other ends of said sleeves to said stationary body, and means for conveying fluid to said pressure chamber.

3. In a hydrostatic brake, a stationary body, an element movably mounted on said body and guided thereby for movement with respect thereto, a pair of concentric elastic sleeves having the space therebetween providing a pressure chamber, said movable element having an annular projection extending between said sleeves at one end thereof and having said ends of said sleeves surface bonded thereto, annular metallic reinforcements secured to the other ends of said sleeves, means for clamping said reinforcements to said stationary body, and means for conveying fluid to said pressure chamber.

4. In a hydrostatic brake, a stationary body, an element movably mounted on said body and guided thereby for movement with respect thereto, a pair of concentric elastic sleeves having the space therebetween providing a pressure chamber, said movable element having an annular projection extending between said sleeves at one end thereof and having said ends of said sleeves surface bonded thereto, annular metallic reinforcements secured to the other ends of said sleeves, the reinforcement on the outer sleeve being externally disposed and the reinforcement on the inner sleeve being internally disposed, means clamping said reinforcements to said stationary body, and means for conveying fluid under pressure to said pressure chamber.

5. In a hydrostatic brake, a stationary support, an annular fluid chamber formed in said support, means for conveying fluid under pressure to said chamber, means movable responsive to the fluid pressure in said chamber for operating the brake, sealing means arranged concentrically along the opposite walls of said chamber for sealing the fluid therebetween, and a pair of annular metallic members reinforcing said sealing means and anchoring same to said support and arranged one within the area defined by the inner sealing means and the other without the area defined by the outer sealing means.

CLAUDE SAUZEDDE.